United States Patent
Rafey

(10) Patent No.: US 11,314,609 B2
(45) Date of Patent: Apr. 26, 2022

(54) DIAGNOSING AND REMEDIATING ERRORS USING VISUAL ERROR SIGNATURES

(71) Applicant: EMC IP Holding Company LLC, Hopkinton, MA (US)

(72) Inventor: Mohammad Rafey, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 337 days.

(21) Appl. No.: 16/662,828

(22) Filed: Oct. 24, 2019

(65) Prior Publication Data
US 2021/0124661 A1    Apr. 29, 2021

(51) Int. Cl.
| | | |
|---|---|---|
| *G06F 11/00* | (2006.01) | |
| *G06F 11/22* | (2006.01) | |
| *G06F 11/30* | (2006.01) | |
| *G06N 20/00* | (2019.01) | |
| *G06F 11/34* | (2006.01) | |
| *G06N 5/04* | (2006.01) | |

(52) U.S. Cl.
CPC ........ *G06F 11/2257* (2013.01); *G06F 11/302* (2013.01); *G06F 11/3006* (2013.01); *G06F 11/3495* (2013.01); *G06N 5/04* (2013.01); *G06N 20/00* (2019.01)

(58) Field of Classification Search
CPC ............ G06F 11/2257; G06F 11/3006; G06F 11/302; G06F 11/3495; G06F 11/0793; G06F 11/32; G06F 11/0751; G06N 20/00; G06N 5/04
See application file for complete search history.

(56) References Cited

U.S. PATENT DOCUMENTS

| 10,439,971 B1 * | 10/2019 | Beale ................... G06N 3/08 |
| 10,936,807 B1 * | 3/2021 | Walters ................. G06F 8/65 |
| 2016/0117211 A1 | 4/2016 | Makuch et al. |

(Continued)

FOREIGN PATENT DOCUMENTS

WO    2015171860 A1    11/2015

OTHER PUBLICATIONS

U.S. Appl. No. 16/050,364 filed in the name of Mohammad Rafey Jul. 31, 2018 and entitled "Intelligent Monitoring and Diagnostics for Application Support."

*Primary Examiner* — Jonathan D Gibson
(74) *Attorney, Agent, or Firm* — Ryan, Mason & Lewis, LLP

(57) ABSTRACT

A method includes detecting an error that has occurred in one or more assets of an enterprise system and generating a visual error signature of the detected error, the visual error signature comprising at least a portion of a graph-based visualization of operation of the assets. The method also includes providing the generated visual error signature for the detected error as input to a machine learning model and utilizing the machine learning model to classify the visual error signature for the detected error as belonging to at least a given one of a plurality of error classes, the machine learning model being trained using historical visual error signatures for previously-detected errors. The method further includes identifying at least one action taken to remediate each of one or more previously-detected errors of the given error class and remediating the detected error utilizing one or more of the identified actions.

20 Claims, 13 Drawing Sheets

(56) References Cited

U.S. PATENT DOCUMENTS

| | | | |
|---|---|---|---|
| 2016/0162803 A1* | 6/2016 | Amershi | G06F 11/162 |
| | | | 714/57 |
| 2017/0097860 A1 | 4/2017 | Pang | |
| 2018/0144130 A1* | 5/2018 | Wolff | G06N 3/0454 |
| 2018/0165854 A1* | 6/2018 | Du | G06N 20/00 |
| 2018/0321977 A1* | 11/2018 | Moore | G06F 9/5027 |
| 2019/0250984 A1* | 8/2019 | He | G06F 11/1048 |
| 2019/0372968 A1* | 12/2019 | Balogh | H04L 63/0861 |
| 2020/0151087 A1* | 5/2020 | Cappello | G06F 11/3648 |
| 2020/0175377 A1* | 6/2020 | Iio | G06N 3/084 |
| 2020/0327005 A1* | 10/2020 | Singh | G06F 11/3006 |
| 2020/0327008 A1* | 10/2020 | Singh | G06K 9/00469 |
| 2020/0379454 A1* | 12/2020 | Trinh | G05B 23/024 |
| 2021/0081831 A1* | 3/2021 | Angel | G06N 7/005 |
| 2021/0374027 A1* | 12/2021 | Joglekar | G06F 11/32 |

* cited by examiner

DIAGNOSING AND REMEDIATING ERRORS USING VISUAL ERROR SIGNATURES

FIELD

The field relates generally to information processing systems, and more particularly to managing information processing systems.

BACKGROUND

Information processing systems, such as enterprise systems comprising assets of an enterprise, may encounter various errors during operation of the assets. In some cases, software applications running on the assets of an enterprise system encounter errors due to misconfiguration, faults in the applications, vulnerabilities or security threats, etc. Such errors present risks that can expose the enterprise and its users or devices. As the number of assets in an enterprise system grows, the number of errors encountered will generally increase. The task of monitoring for, diagnosing and remediating such errors thus presents various challenges.

SUMMARY

Illustrative embodiments provide techniques for diagnosing and remediating errors using visual error signatures.

In one embodiment, a method comprises detecting an error that has occurred in one or more assets of an enterprise system and generating a visual error signature of the detected error, the visual error signature comprising at least a portion of a graph-based visualization of operation of the one or more assets of the enterprise system. The method also comprises providing the generated visual error signature for the detected error as input to a machine learning model and utilizing the machine learning model to classify the visual error signature for the detected error as belonging to at least a given one of a plurality of error classes, the machine learning model being trained using historical visual error signatures for a plurality of previously-detected errors. The method further comprises identifying at least one action taken to remediate each of one or more previously-detected errors of the given error class and remediating the detected error utilizing one or more of the identified actions. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIGS. 3A-3D show generation of a visual error signature from a portion of a finite state machine representation in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
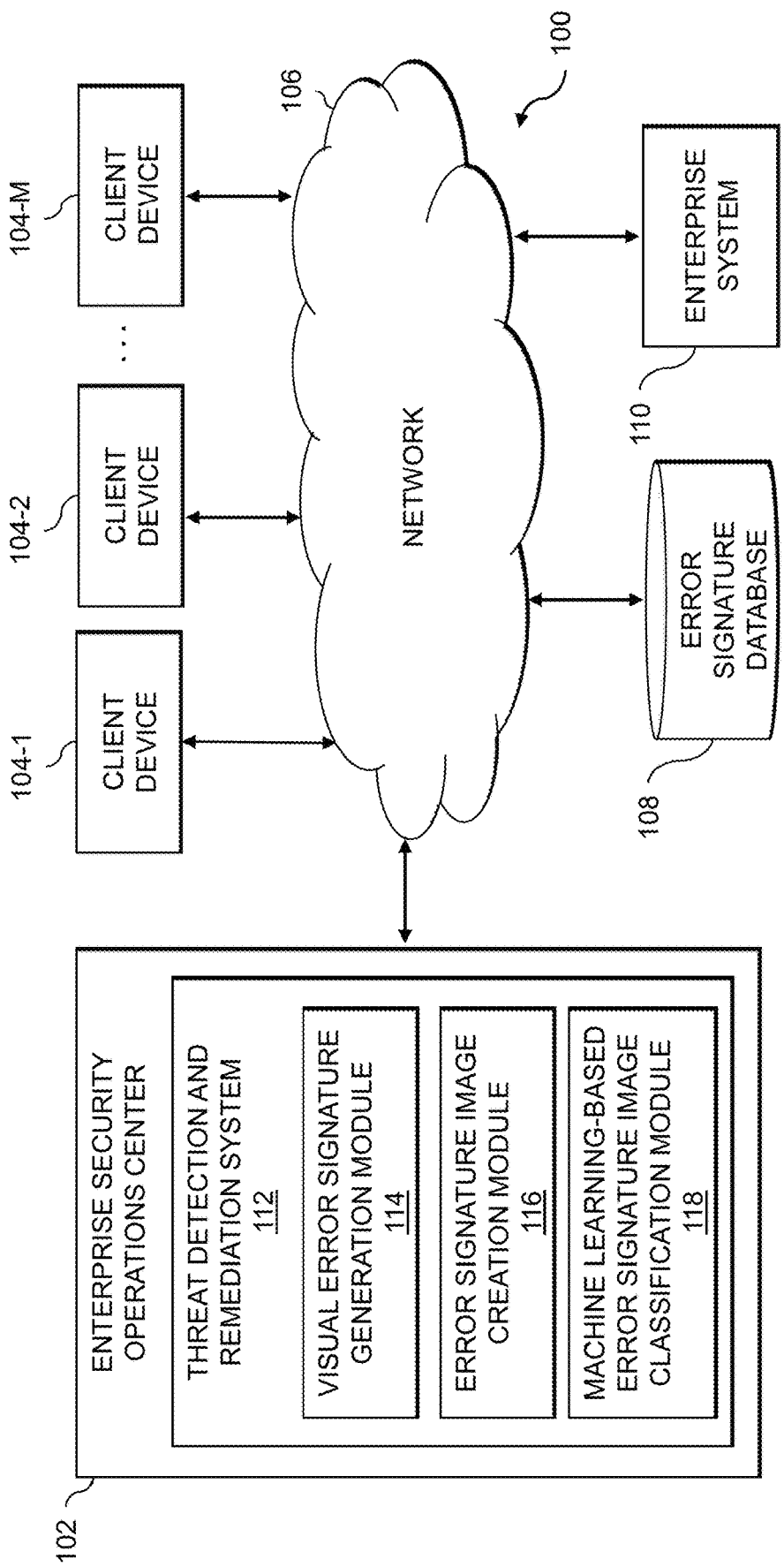
FIG. 1 is a block diagram of an information processing system for diagnosing and remediating errors using visual error signatures in an illustrative embodiment.

FIG. 1 shows an information processing system 100 configured in accordance with an illustrative embodiment. The information processing system 100 is assumed to be built on at least one processing platform and provides functionality for diagnosing and remediating errors encountered on or by assets of an enterprise system 110 utilizing visual error signatures. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M (collectively, client devices 104). The enterprise SOC 102 and the client devices 104 are coupled to a network 106. Also coupled to the network 106 is an error signature database 108, which may store various information relating to visual error signatures as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The error signature database 108, as discussed above, is configured to store and record information relating to errors encountered on or by assets of the enterprise system 110, including visual error signatures for such errors. The error signature database 108 may store application logs or other sources of information about the errors, finite state machines depicting functioning of the assets, visual error signatures, machine learning models for classifying visual error signatures, etc.

The error signature database 108 in some embodiments is implemented using one or more storage systems or devices associated with the enterprise SOC 102. In some embodiments, one or more of the storage systems utilized to implement the error signature database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102 and a threat detection and remediation system 112 implemented on the enterprise SOC 102, as well as to support communication between the enterprise SOC 102, the threat detection and remediation system 112, and other related systems and devices not explicitly shown.

The client devices 104 are configured to access or otherwise utilize assets of an enterprise system 110. The enterprise system 110 may represent an information technology (IT) infrastructure comprising a plurality of assets (e.g., physical or virtual computing resources) of a business, entity or other enterprise. Such assets are assumed to encounter errors that are diagnosed and remediated by the enterprise SOC 102 utilizing the threat detection and remediation system 112.

In the present embodiment, alerts or notifications generated by the threat detection and remediation system 112 of the enterprise SOC 102 are provided over network 106 to client devices 104, or to a system administrator, IT manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given host agent may comprise a mobile telephone equipped with a mobile application configured to receive alerts from the enterprise SOC 102 or the threat detection and remediation system 112 and to provide an interface for the security agent to select particular remediation measures for responding to the alert or notification (e.g., which may be generated in response to encountering one or more errors on or by assets of the enterprise system 110). Examples of such remediation measures may include blocking access by one or more of the client devices 104 to assets of the enterprise system 110, requiring user input or authentication by the client devices 104 to obtain information from or otherwise utilize one or more assets of the enterprise system 110, triggering further review of the enterprise system 110 or assets thereof, etc. Remediation measures may also include applying security hardening procedures to assets of the enterprise system 110, establishing new or modified monitoring of assets of the enterprise system 110, changing or adjusting the configuration of assets of the enterprise system 110, etc.

It should be noted that a "host agent" as this term is generally used herein may comprise an automated entity, such as a software entity running on a processing device. Accordingly, a host agent need not be a human entity.

As shown in FIG. 1, the enterprise SOC 102 comprises threat detection and remediation system 112. As will be described in further detail below, the threat detection and remediation system 112 is configured to diagnose and remediate errors in the enterprise system 110 utilizing visual error signatures.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a visual error signature generation module 114, an error signature image creation module 116, and a machine learning-based error signature image classification module 118.

The threat detection and remediation system 112 is configured to detect when errors occur on assets of the enterprise system 110 (e.g., by analyzing application logs of applications running on such assets, by receiving alerts or notifications from the assets of the enterprise system 110 or from client devices 104 utilizing such assets, etc.). The visual error signature generation module 114 is configured to generate visual error signatures for such detected errors. The visual error signatures may each comprise a portion of a graph-based visualization of operation of the assets of the enterprise system 110. In some embodiments, the visual error signatures are extracted portions of finite state machines (FSMs) as described in further detail below.

The error signature image creation module 116 is configured to provide the generated visual error signatures for the detected errors as input to the machine learning-based error signature image classification module 118 in a format that is suitable for use by a machine learning model of the machine learning-based error signature image classification module 118. This may involve saving or converting the visual error signatures into images of a pre-defined size (e.g., in terms of pixel size) and then translating such images into matrix representations.

The machine learning-based error signature image classification module 118 is configured to classify each of the visual error signatures for detected errors as belonging to one or more of a plurality of error classes using the machine learning model, which is trained using historical visual error signatures for previously-detected errors. The threat detection and remediation system 112 is configured, for a given detected error classified as belonging to a given error class, to identify at least one action taken to remediate each of one or more previously-detected errors of the given error class and to remediate the given detected error utilizing one or more of the identified actions.

It is to be appreciated that the particular arrangement of the enterprise SOC 102, the threat detection and remediation system 112, the visual error signature generation module 114, the error signature image creation module 116, and the machine learning-based error signature image classification module 118 illustrated in the FIG. 1 embodiment is presented by way of example only, and alternative arrangements can be used in other embodiments. As discussed above, for example, the enterprise SOC 102, the threat detection and remediation system 112, the visual error signature generation module 114, the error signature image creation module 116, and the machine learning-based error signature image classification module 118 may in some embodiments be implemented internal to one or more of the client devices 104. As another example, the functionality associated with the visual error signature generation module 114, the error signature image creation module 116, and the machine learning-based error signature image classification module 118 may be combined into one module, or separated across more than three modules with the multiple modules possibly being implemented with multiple distinct processors or processing devices.

At least portions of the visual error signature generation module 114, the error signature image creation module 116, and the machine learning-based error signature image classification module 118 may be implemented at least in part in the form of software that is stored in memory and executed by a processor.

It is to be understood that the particular set of elements shown in FIG. 1 for diagnosing and remediating errors in the enterprise system 110 utilizing visual error signatures is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (SIEM) system, a Governance, Risk and Compliance (GRC) system, etc.

The threat detection and remediation system 112 and other portions of the system 100, as will be described in further detail below, may be part of cloud infrastructure.

The threat detection and remediation system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and threat detection and remediation system 112 or components thereof (e.g., the visual error signature generation module 114, the error signature image creation module 116, and the machine learning-based error signature image classification module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
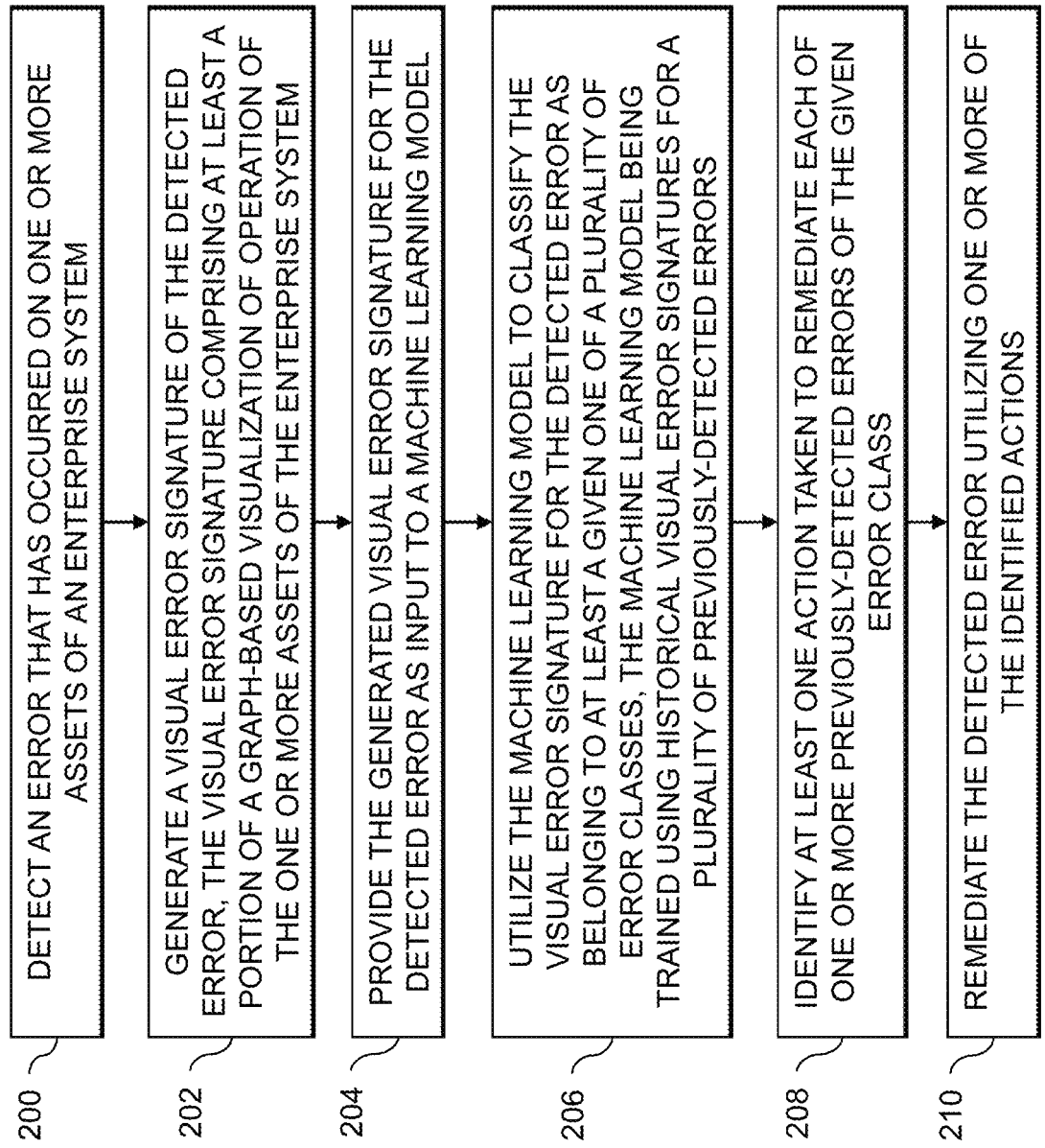
FIG. 2 is a flow diagram of an exemplary process for diagnosing and remediating errors using visual error signatures in an illustrative embodiment.

An exemplary process for diagnosing and remediating errors utilizing visual error signatures will now be described in more detail with reference to the flow diagram of FIG. 2. It is to be understood that this particular process is only an example, and that additional or alternative processes for diagnosing and remediating errors utilizing visual error signatures can be carried out in other embodiments.

In this embodiment, the process includes steps 200 through 210. These steps are assumed to be performed by the threat detection and remediation system 112 utilizing the visual error signature generation module 114, the error signature image creation module 116, and the machine learning-based error signature image classification module 118. The process begins with step 200, detecting an error that has occurred in one or more assets of an enterprise system. The one or more assets of the enterprise system may comprise physical and virtual computing resources in the enterprise system, and detecting the error in step 200 may comprise monitoring applications running on the physical and virtual computing resources. Step 200 may include analyzing log messages collected from the one or more assets, the log messages being used to generate the graph-based visualization of the operation of the one or more assets of the enterprise system.

In step 202, a visual error signature of the detected error is generated. The visual error signature comprises at least a portion of a graph-based visualization of operation of the one or more assets of the enterprise system. In some embodiments, the portion of the graph-based visualization of operation of the one or more assets characterizes two or more sequences of operations of the one or more assets of the enterprises system that diverge from a given operation, the two or more sequences comprising: at least a first sequence of operations to a first outcome comprising successful operation; and at least a second sequence of operations to a second outcome comprising the detected error.

The graph-based visualization may comprise a FSM comprising a plurality of nodes representing states of operation of the one or more assets of the enterprise system and edges connecting the nodes representing transitions between the states of operation of the one or more assets of the enterprise system. The generated visual error signature may comprise a visualization of a given portion of the FSM. The given portion of the FSM may comprise a given one of the nodes corresponding to a state of operation of the one or more assets of enterprise system that is capable of transitioning along at least a first path to a success state and along at least a second path to a failure state, the first path to the success state, and the second path to the failure state.

In step 204, the generated visual error signature for the detected error is provided as input to a machine learning model. Step 204 may include converting the portion of the graph-based visualization into an image of a pre-defined image size and translating the image into a matrix representation for input to the machine learning model. The pre-defined image size may comprise a pre-defined pixel size. The FIG. 2 process continues with utilizing the machine learning model in step 206 to classify the visual error signature for the detected error as belonging to at least a given one of a plurality of error classes. The machine learning model is trained using historical visual error signatures for a plurality of previously-detected errors. The machine learning model may comprise a multi-label classifier, such as a K-nearest neighbor (KNN) classifier, a stochastic gradient descent (SGD) classifier, combinations thereof, etc.

In step 208, at least one action taken to remediate each of one or more previously-detected errors of the given error class are identified. The detected error is remediated in step 210 utilizing one or more of the actions identified in step 208. The identified actions taken to remediate previously-detected errors of the given error class may comprise applying one or more security hardening procedures to the one or more assets of the enterprise system, modifying a configuration of the one or more assets of the enterprise system, combinations thereof, etc.

Error diagnostics and root cause analysis (e.g., for errors encountered by applications running on assets of an enterprise system) may be based on highly textual and contextual error logs and messages. Error message representations (e.g., in .txt file format, in JavaScript Object Notation (JSON) format, Extensible Markup Language (XML) format, etc.) are generally not suitable for use with "computer vision"-assisted error analysis and remediation. Visual processing approaches are promising, but due to a lack of visual error representations, such approaches cannot be effectively leveraged for error analysis and remediation. Illustrative embodiments provide techniques for software error diagnostics and remediation which are based on the combined application of computer vision and machine learning, enabling a computer to "see" errors rather than reading and analyzing textual or contextual error logs and messages.

As noted above, assets of the enterprise system 110 may encounter various types of errors during operation thereof. In the description below, it is assumed that the assets of the enterprise system 110 have the capabilities for logging the asset state (e.g., application states of one or more applications running on the assets of the enterprise system 110). In some embodiments, the logging includes information such as the current state that a particular asset is in and the changes that are occurring to the asset in that state. Such logs are analyzed and translated into an FSM. This may include filtering log data to a designated time range, parsing the filtered logs and converting the logs into the FSM. As more and more logs become available, several paths in the FSM are created. Some paths result in completion as expected (e.g., such paths end in a "success" state of the FSM), while other paths result in errors (e.g., such paths end in a "failure" or "error" state of the FSM). The changes made to the asset state along each path are available in the logs, with such changes being used to help solve issues later on. Analytics and monitoring functionality utilize such changes made during each stage of the FSM to calculate the probability of the asset reaching completion (e.g., a "success" state) given its current stage or state. This helps to monitor the health of the assets in real-time to proactively address potential errors. Further, when errors are encountered, the FSM helps a user to understand where exactly the asset deviated from expected behavior.

In some cases, logging tools (e.g., for assets, applications running on the assets, etc.) have rough guidelines that govern the type of content that should be logged. Such guidelines may vary based on the enterprise system to which the assets belong, and in some cases may be quite vague. Generally, a developer chooses to log content that the developer feels would help them to debug code later on. Some embodiments utilize a standardized XML-formatted log design that includes clear rules on the content to be logged.

The design of the logs may be as follows. Each log may be enclosed in <L></L> tags. These tags have multiple attributes which comprise log elements such as: the log level (e.g., debug info, warn, error, etc.) represented by "T"; the time and date represented by "D"; the activity identifier represented by "AID"; etc. Various other attributes may be used as desired for a particular implementation. All the content for a log is within the <L></L> tags. The logs may be divided into sections, with a first section referred to as the "Flow Context" (denoted as "FC"). Within the FC section, the location in the code where the log is generated from is recorded. The FC section may have sub-divisions (e.g., <FLV="0">, <FLV="1">, etc.). Each level helps to identify the location from where the log was generated to a greater extent. For example, FLV 0 may indicate the namespace, project or class, while FLV 1 indicates a method, etc. More levels may be used as desired to focus in on a specific location in the code.

The next section is referred to as the "Data Context" and is denoted by <DC></DC> tags. The Data Context section contains all the variables whose values were changed and new variables that were added during the transition from the current state to the next state. Each variable in the Data Context section is enclosed in Data tags denoted by <D></D>. These tags have an attribute indicating the name of the variable (e.g., <D Key="CustomerNumber"> . . . </D>.

The final section is referred to as "Message Context" and is denoted by <MC></MC> tags. The Message Context section contains a specific message that helps describe the transition that will take place from the current state to the next state. Each log would thus help identify the state the application or other asset is currently in (e.g., using the Flow Context) and the transition that caused it to reach that state (e.g., using the Message Context and Data Context). The above-described logging standards help to create an FSM utilized to understand the changes that were made during application or other asset processing with greater ease. It should be appreciated, however, that various other logging standards or structures may be used in other embodiments.

When an issue or error is encountered on or by an asset (e.g., in application processing of one or more applications running on an asset), the system initiates a search beginning at a time at which the error was noticed and works backwards. For this, some embodiments utilize a search framework that filters through the logs using date and time and log level (e.g., error, warn, fatal, etc.). Assume that an error is encountered at a specific time and date, and it is desired to see all logs around that specific time and date to understand why the issue occurred. The logs may be searched and filtered to the specific time and date (e.g., or a time and date range around the specific time and date). The logs are then parsed to create the FSM, with each section of the logs providing certain information used in creating the FSM.

The Flow Context is used to define a state (e.g., using the context across levels, the states that can be defined are "NameSpace1.Component1-Method1-Block1", "NameSpace1.Component1-Method1-Block2", etc.). The Message Context and Data Context values are used to define a transition (e.g., a transition because of "Validation API called with values—120, 21/02/02" and "Validation API returned an error"). The date and time of the log (e.g., which is present in the "D" attribute of parent <L> tags) helps to define the sequence of the states. The rest of the attributes in the <L> tags can be used to make states more information rich.

Creating an FSM provides several advantages. The FSM, for example, gives the entire history of application or other asset processing (e.g., all the actions that took place that would have led to the current state of the application or other asset). The FSM also shows all the possible paths where the application or other asset can follow to reach a desired end state. Representing the processing of an application or other asset as an FSM also helps to identify exactly when the processing of an application or other asset deviated onto a path that led to an error. This helps to identify early on when an application or other asset may face an error and proactively take action to avoid the error.

Each stage or state in the FSM may have a number of attributes, including a total count, a successful count and a success rate. The total count is the number of times that stage or state in the FSM has been reached (e.g., the number of times a transition has led to the application or other asset moving to that stage or state). The success count is the number of transitions starting from the current stage or state that eventually end in a success state. The success rate may be calculated by dividing the successful count by the total count.

With the success rate being updated in real-time, it is possible to monitor the health of the application or other asset. When a new log entry causes a transition to a stage or state where the success rate is less than a designated threshold, an alert or notification may be provided to the relevant stakeholder (e.g., using host agents as described above). The alert or notification may include information that narrows down the exact point or state at which the application or other asset moved to a path in the FSM where it would most likely end up in an error (e.g., on a path with the success rate less than the designated threshold). Since the FSM is assumed to include information regarding the reasons for transitions between stages or states, the FSM can represent in a clear manner the difference between when the application or other asset completes processing as expected and when it does not. The impact of an issue or other error can be assessed using the above-described total count metric. For example, the alert or notification may indicate a percentage chance that the application or other asset is likely to encounter the error.

Figure 3A:
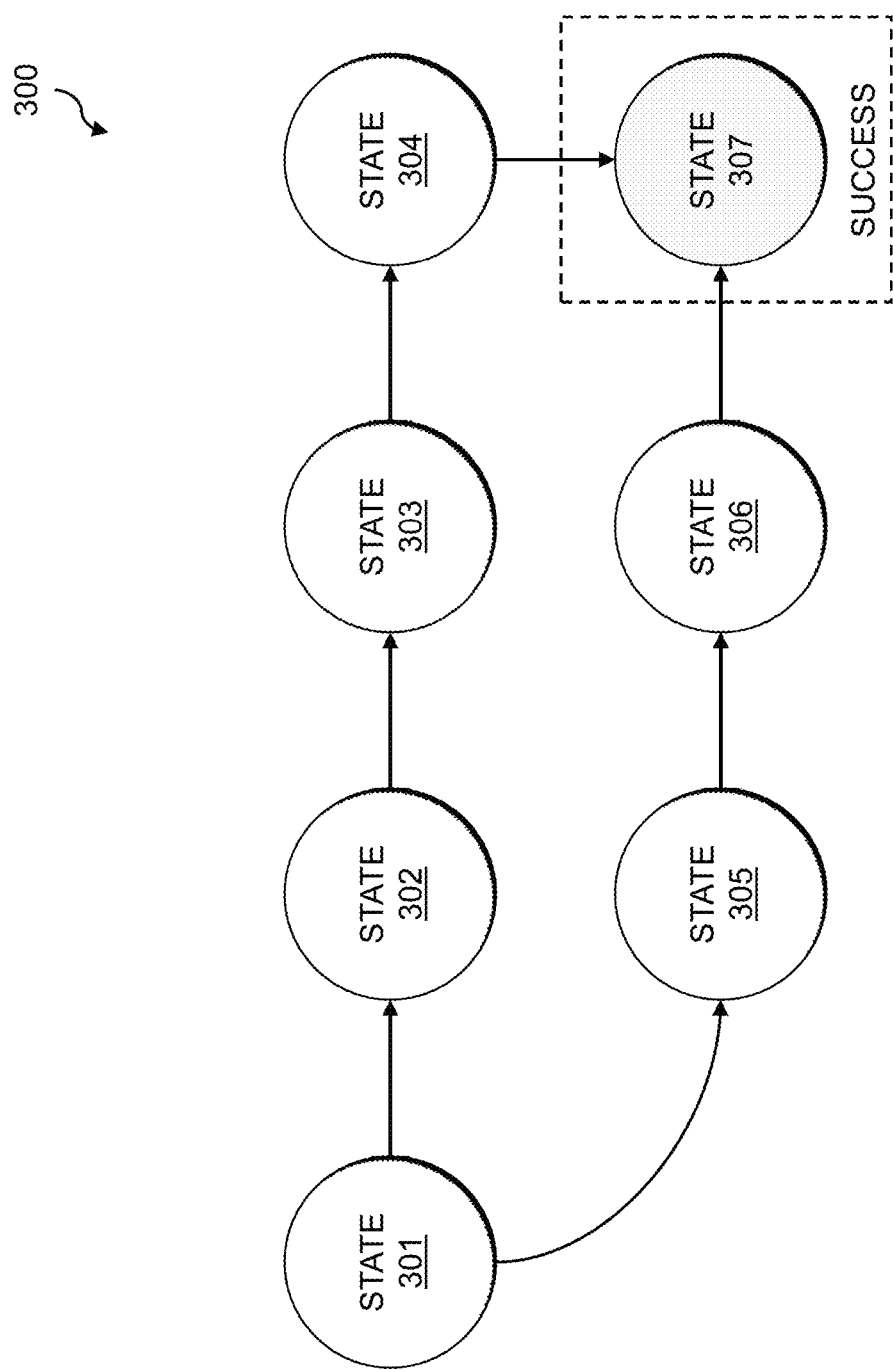
Figure 3B:
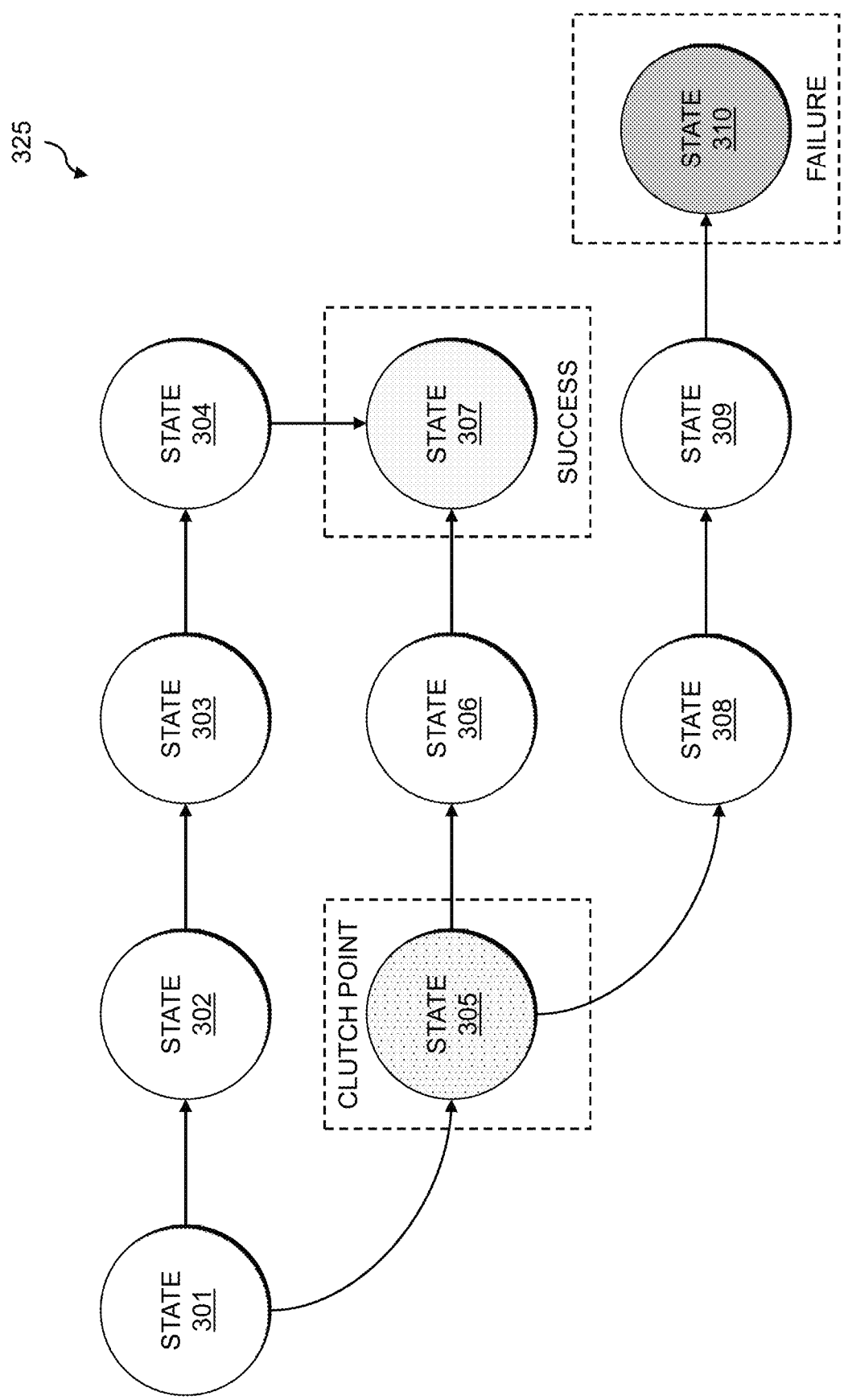

Given the above, errors (e.g., application or other asset errors and failures) may be modeled in terms of FSMs. FIGS. 3A-3D illustrate how such FSMs may be used in the generation of visual error signatures. FIG. 3A shows a visualization 300 of a portion of a FSM including states 301 through 307. As illustrated in FIG. 3A, there are multiple paths in the FSM from state 301 to state 307, which is assumed to be a "success" state (e.g., from state 301, the FSM may transition along the path including states 302 through 304 or along the path including states 305 and 306). FIG. 3B shows a visualization 325 of the FSM in FIG. 3A, expanded to illustrate a path from state 305 to states 308 and 309 leading to a failure state 310. The state 305 in this example FSM is a "clutch point" in that transition from this state along one path leads to the success state 307 while transition to another state along a different path leads to the failure state 310. As discussed above, edges in the FSM may indicate metrics such as the likelihood of going to these different paths. Alerts or notifications may be generated and sent to host agents on client devices 104 when an asset enters a clutch point state to proactively seek to avoid entering the path to the failure state 310.

Figure 3C:
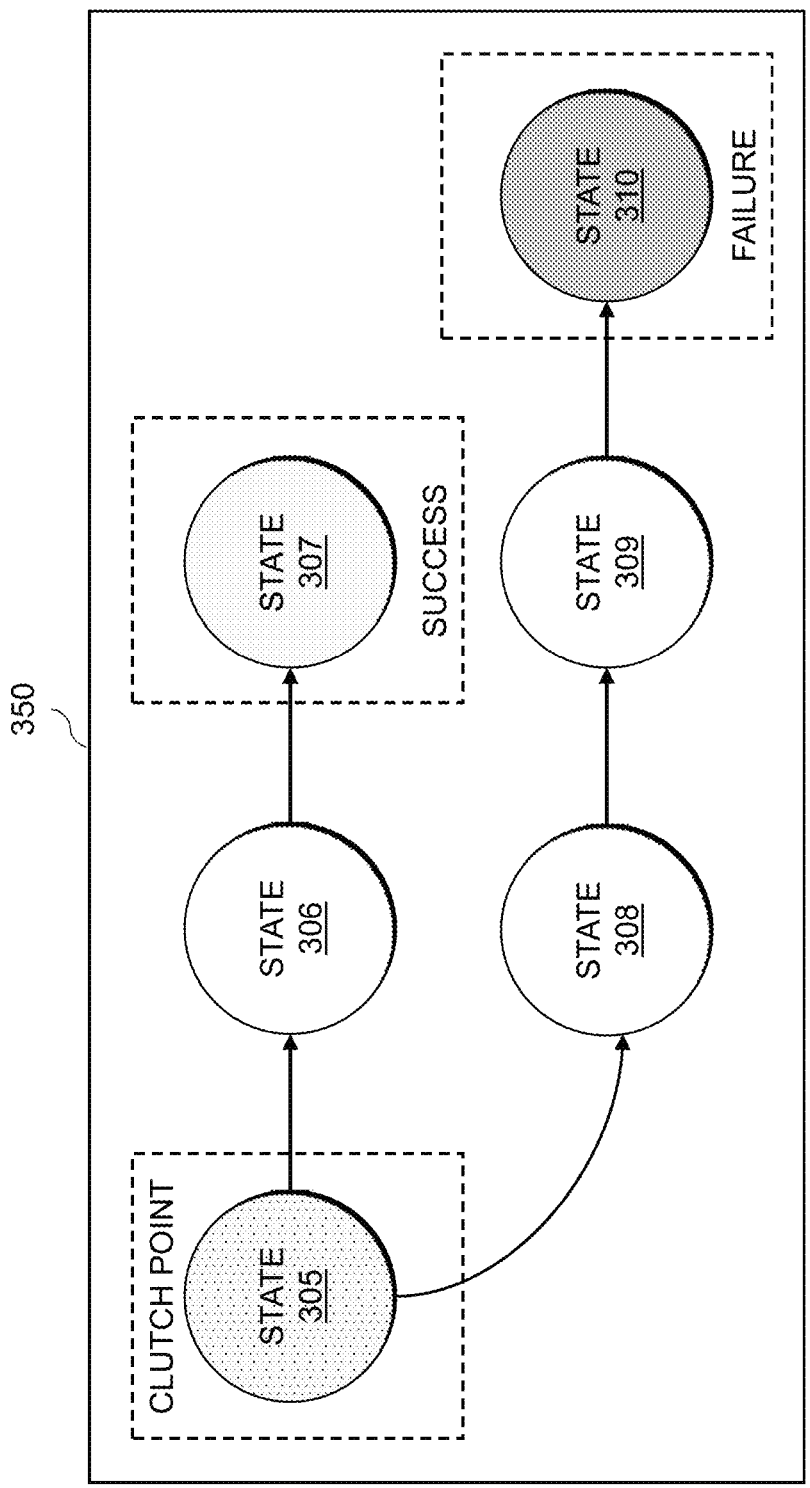

In some embodiments, portions of FSMs from possible clutch points to failure states are extracted and used to build a visual error representation (e.g., a visual error signature). Continuing with the above example, FIG. 3C shows an image 350 which is a portion of the FSM in visualization 325 that includes the clutch point state 305 and the paths to the success state 307 and failure state 310. This is an example of a visual error signature which may be saved in a visual error signature repository (e.g., in error signature database 108). The collection of visual error signatures stored in the error signature repository is used to train a machine learning model to classify newly-encountered errors. Such classification may include, but is not limited to, predicting the class or classes or error signatures that a newly encountered error belongs to. This classification may be used by an error remediation system (e.g., threat detection and remediation system 112) to remedy the newly-encountered error. For example, techniques for resolving other errors having the same error signature class may be applied to remediate the newly-encountered error. If the newly-encountered error is successfully remediated, a new visual error signature may be added to the error signature repository for continuous training of the machine learning model.

Figure 3D:
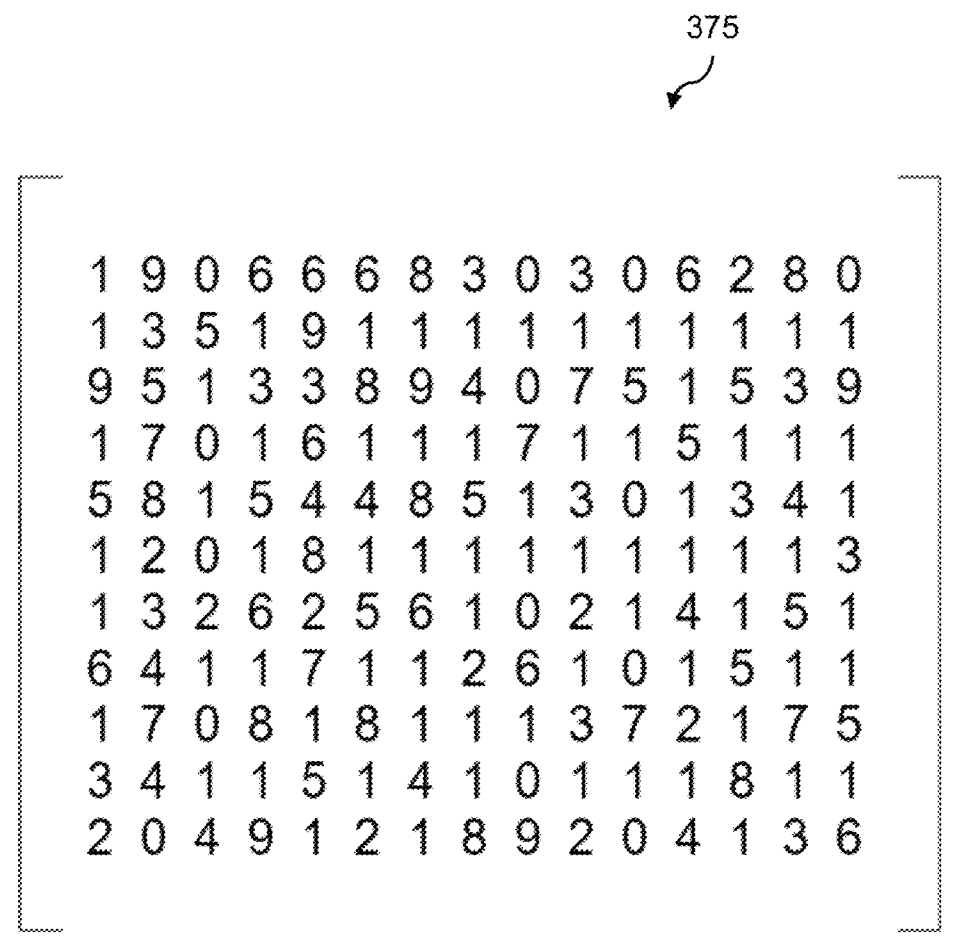

The image 350 in FIG. 3C may be in a "standard" image format, such as some pre-defined pixel size image format. Then, the image 350 is converted to a matrix representation 375 as shown in FIG. 3D. The matrix representation 375 of the error signature is used as input to a machine learning model for classification.

Figure 4A:
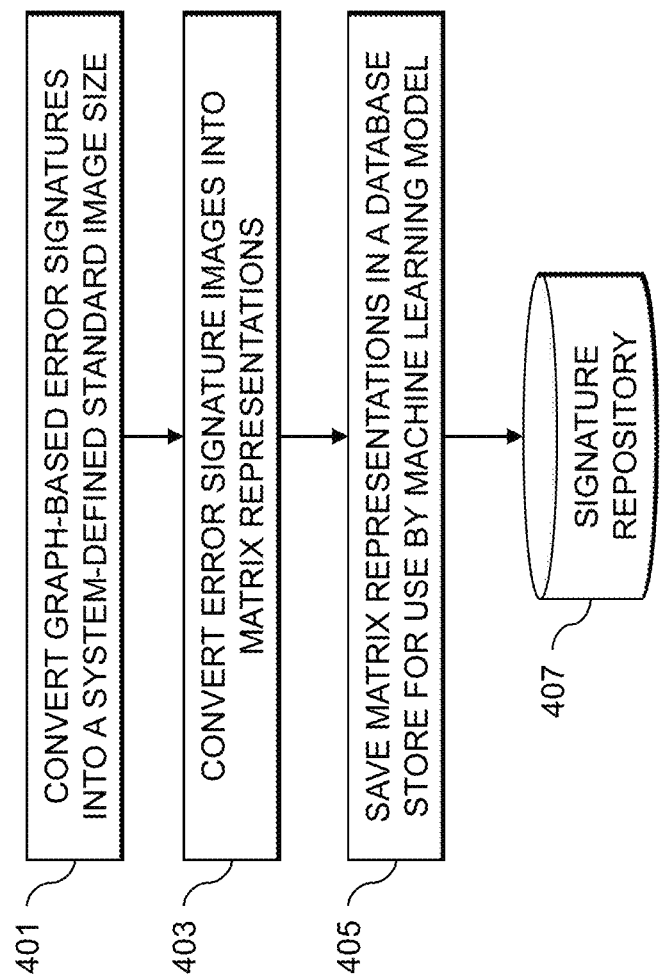
FIGS. 4A and 4B show a system flow for diagnosing and remediating errors using visual error signatures in an illustrative embodiment.
Figure 4B:
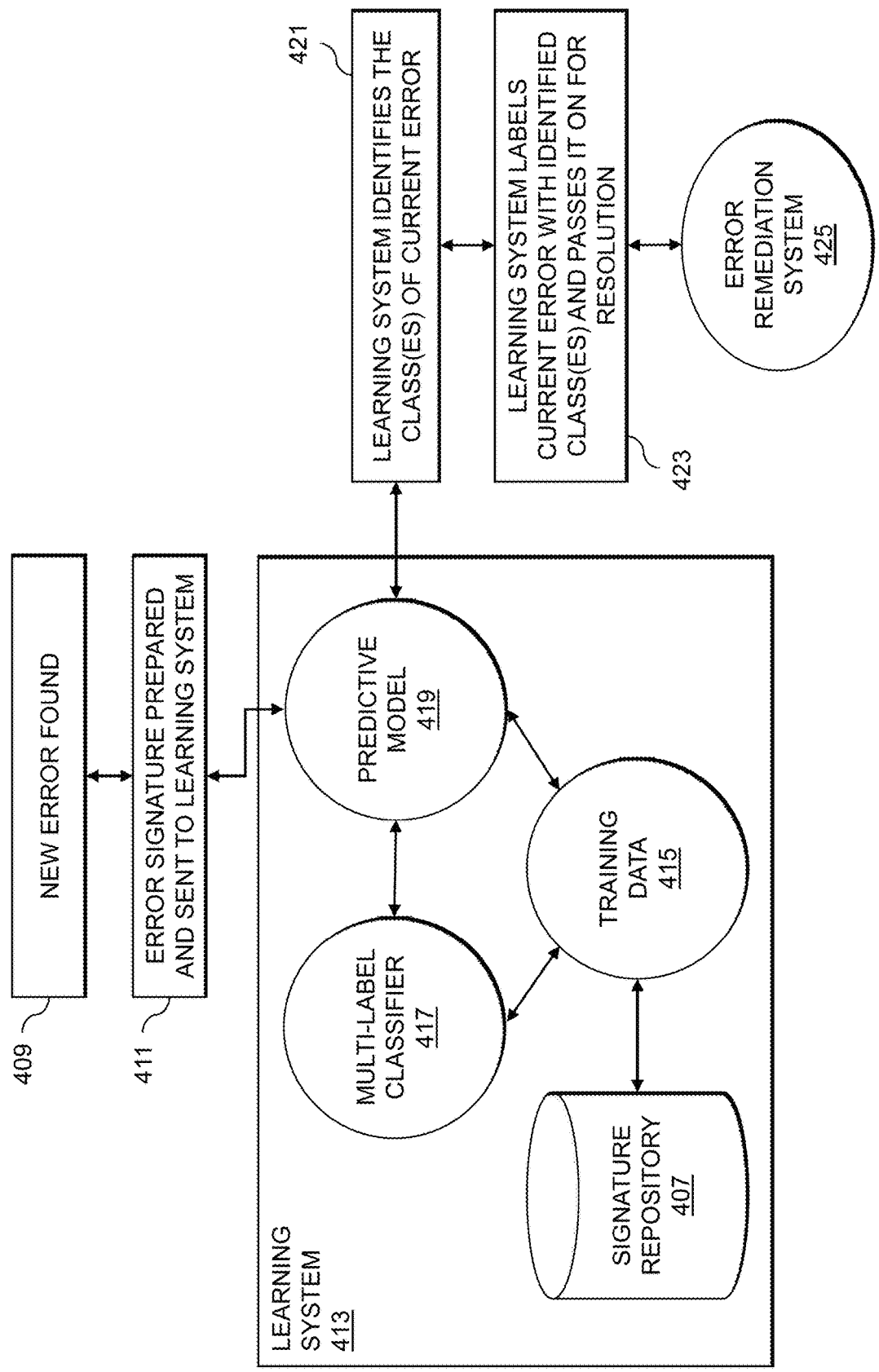

FIGS. 4A and 4B illustrate a system flow for diagnosing and remediating errors using visual error signatures. More particularly, FIG. 4A illustrates a portion of the flow for building a repository of visual error signatures, and FIG. 4B illustrates processing when encountering new errors. The system flow begins in FIG. 4A with step 401, converting graph-based error signatures (e.g., in the form of portions of a FSM) into a system-defined standard image size (e.g., in terms of pixel size). Next, the error signature images are converted to matrix representations in step 403. The matrix representations are saved in step 405 to a database store for use by a machine learning model. In the FIG. 4A example, the database store is signature repository 407.

The system flow continues in FIG. 4B with finding a new error in step 409. Errors may be found or detected by monitoring assets of an enterprise system (e.g., by monitoring applications). In step 411, a visual error signature of the current error found in step 409 is prepared and sent to a learning system 413. The learning system 413 obtains training data 415 from the signature repository 407 for training a multi-label classifier 417. The multi-label classifier 417 is also coupled to a predictive model 419 that takes the visual error signature of the current error (prepared in step 411) and identifies the class or classes of the current error in step 421 using the trained multi-label classifier 417. In step 423, the learning system 413 labels the current error with the identified classes from step 421 and passes the labeled current error to an error remediation system 425 for resolution.

In some embodiments, the multi-label classifier 417 utilizes a binary classifier machine learning algorithm, such as a SGD classifier. In other embodiments, the multi-label classifier 417 utilizes a KNN classifier (also referred to herein a K-neighbors classifier). It should be appreciated that both approaches are fundamentally similar, with the exception of the number of classes that such approaches classify error signatures into. It should be further appreciated that in other embodiments, other types of machine learning algorithms (e.g., neural network architectures such as convolutional neural networks (CNNs) with an input layer for receiving the visual error signature images, hidden layers for detecting features in the images of the visual error signatures using various activation functions, and an output layer that utilizes detected features for classification) may be used for classifying the visual error signature images.

Figure 5A:
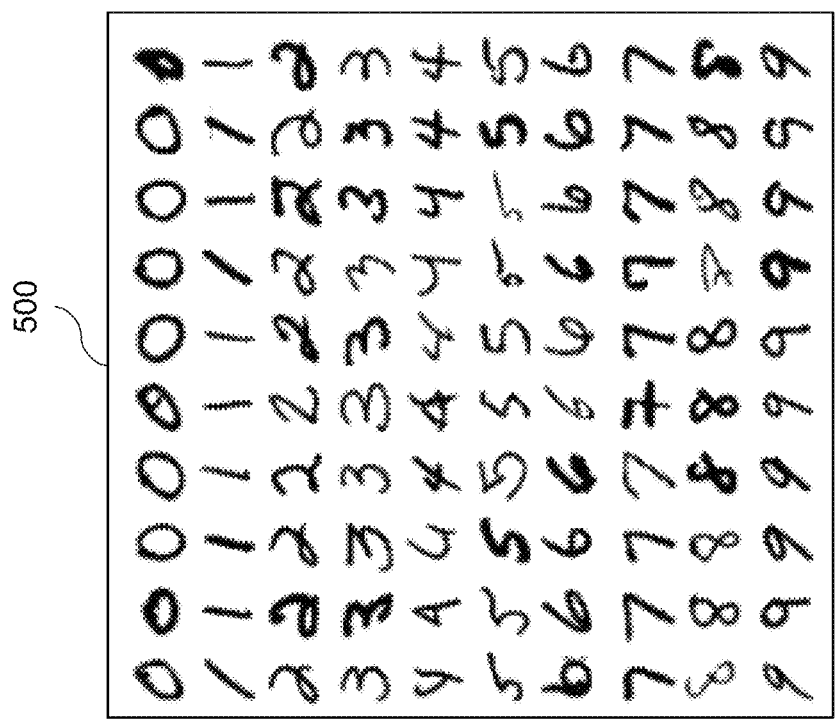
FIGS. 5A-5C show examples of visual error signatures in an illustrative embodiment.
Figure 5B:
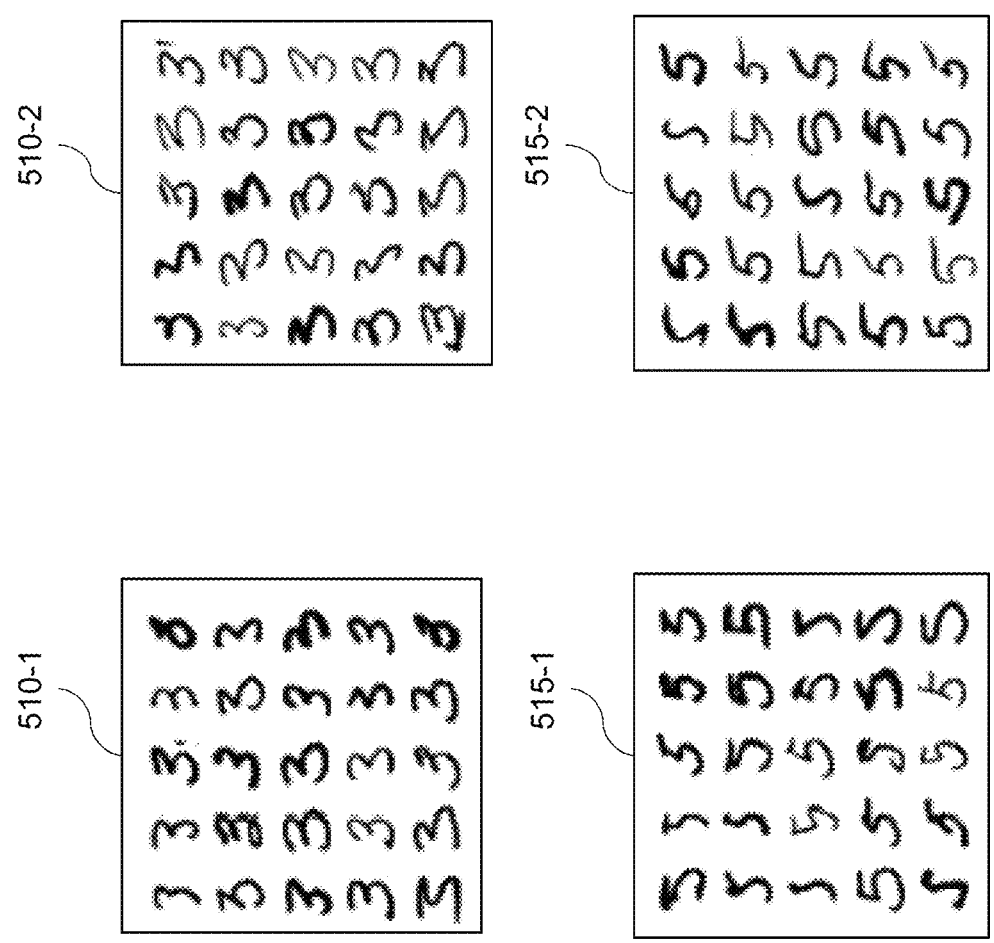
Figure 5C:
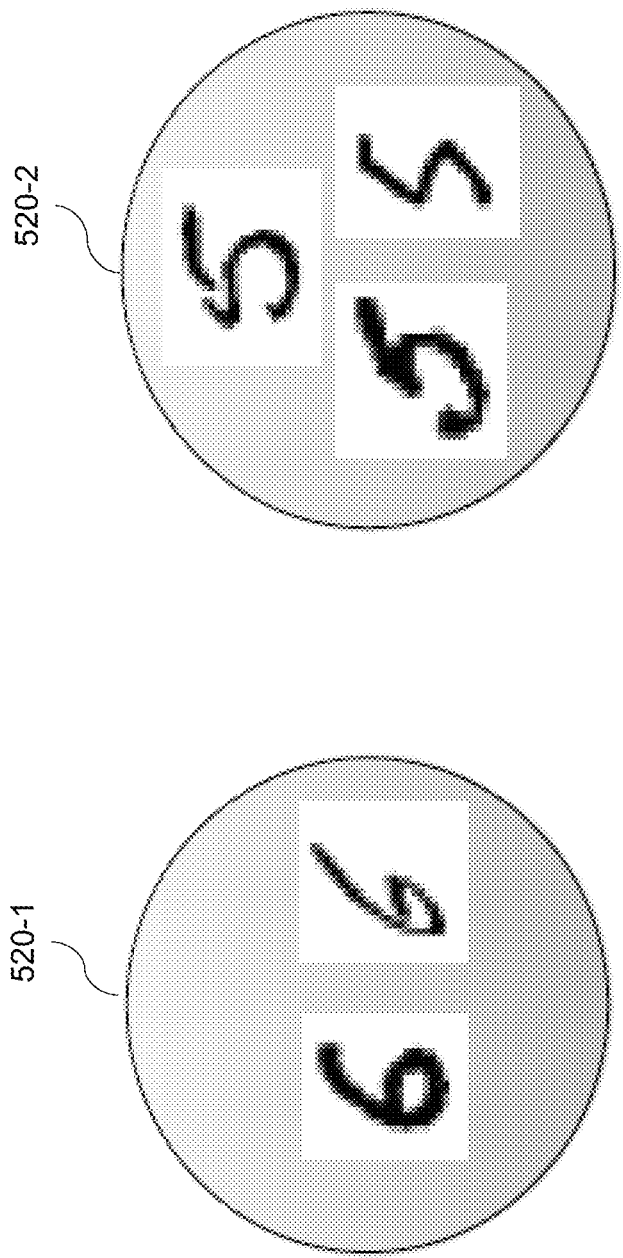

FIGS. 5A-5C show examples of visual error signatures. FIG. 5A shows a collection 500 of visual error signatures (e.g., variations in handwriting of digits 0 through 9). FIG. 5B shows variants of the same errors but with different error signatures, such as variants of error signatures 510-1 and 510-2 for the digit 3 and variants of error signatures 515-1 and 515-2 for the digit 5. The trained multi-label classifier 417 will identify that variants 510-1 and 510-2 belong to the same class for digit 3, and will also identify that variants 515-1 and 515-2 belong to the same class for digit 5. FIG. 5C shows sample error signatures 520-1 and 520-2 for the digits 6 and 5, respectively, along with variants thereof. FIGS. 5A-5C illustrate how a machine learning-based classifier such as multi-label classifier 417 is able to classify images.

Illustrative embodiments provide techniques for error diagnostics and intelligent remediation based on a combined application of computer vision and machine learning. Advantageously, some embodiments build visual error signatures by extracting portions of a FSM graph-based representation from clutch states to failure states, and representing such extracted portions in a designated image format. These images may then be converted into a matrix representation for input to a machine learning model. A collection of historical visual error signatures may be used to train the machine learning model, such as using a multi-label classifier (e.g., a K-neighbors classifier). The trained machine learning model is used to predict categories or classes of newly encountered errors for effective remediation.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for diagnosing and remediating errors using visual error signatures will now be described in greater detail with reference to FIGS. 6 and 7. Although described in the context of system 100, these platforms may also be used to implement at least portions of other information processing systems in other embodiments.

Figure 6:
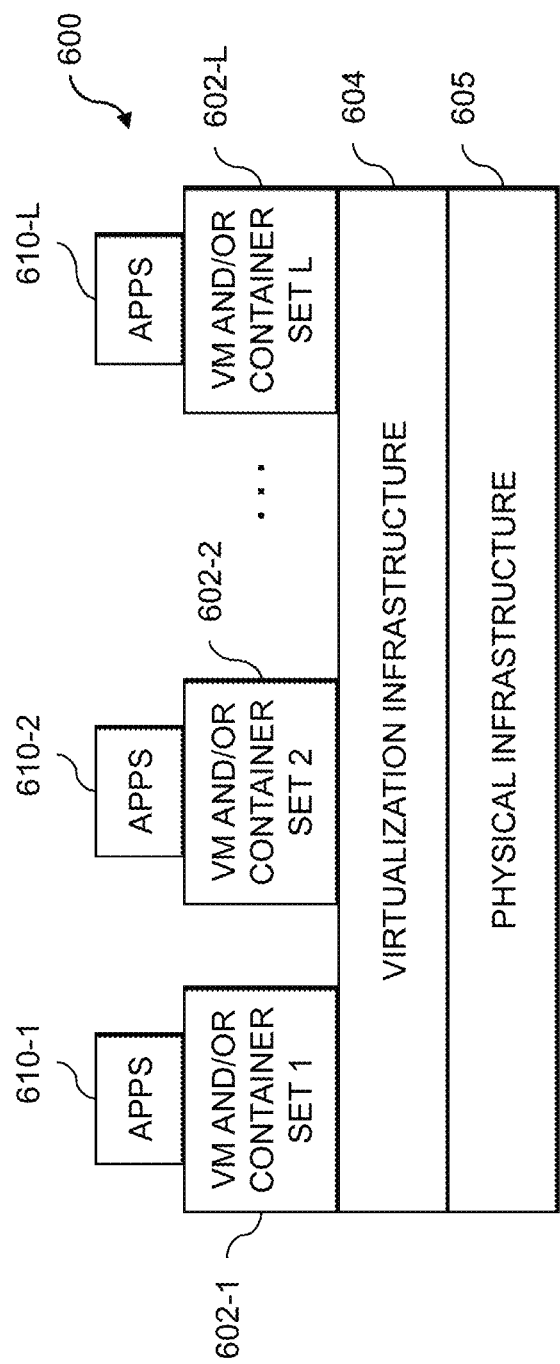
FIGS. 6 and 7 show examples of processing platforms that may be utilized to implement at least a portion of an information processing system in illustrative embodiments.
Figure 7:
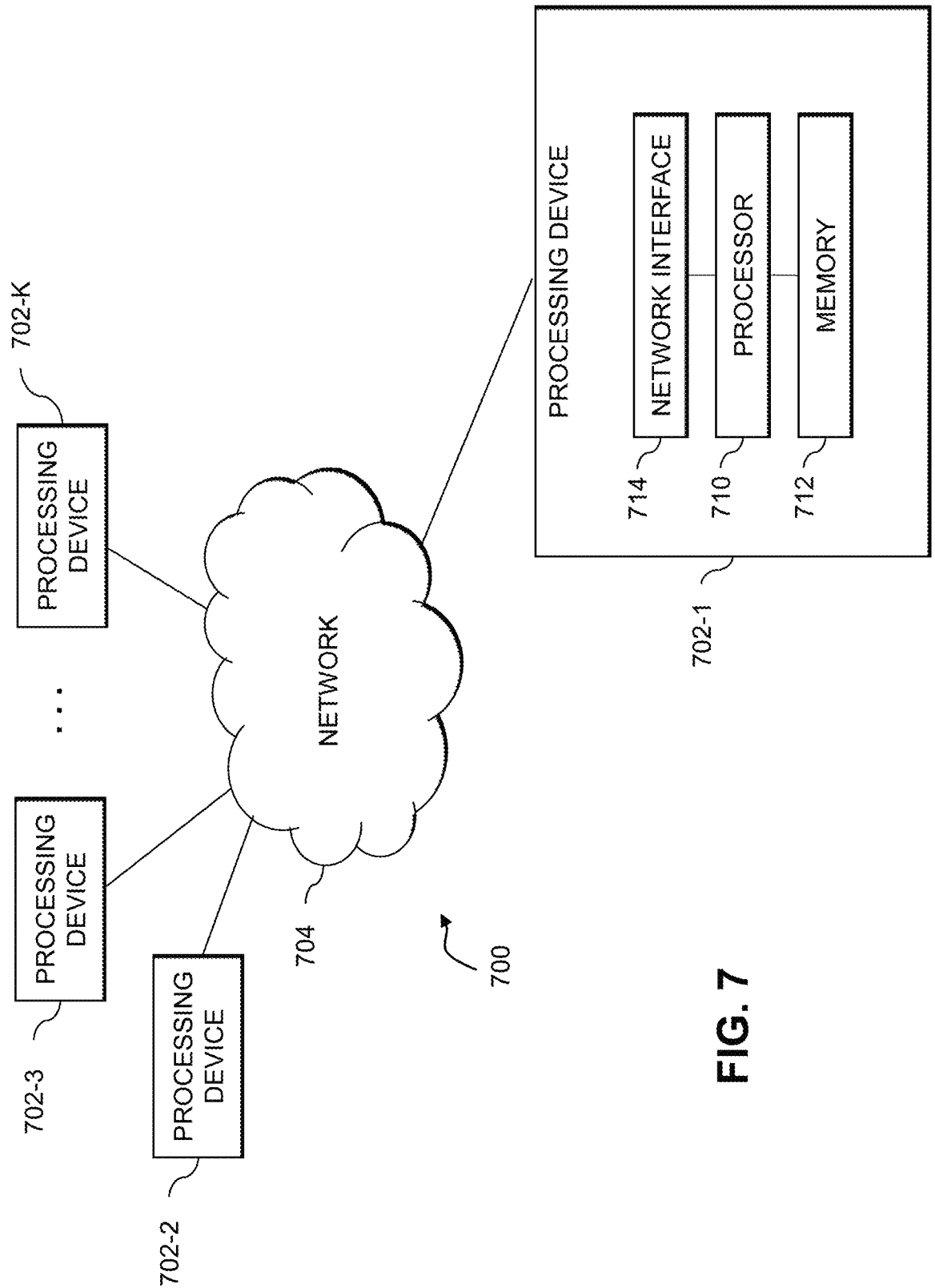

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for diagnosing and remediating errors using visual error signatures as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, errors, error signatures, machine learning algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   detecting an error that has occurred in one or more assets of an information technology infrastructure;
   generating a visual error signature of the detected error, the visual error signature comprising at least a portion of a graph-based visualization of operation of the one or more assets of the information technology infrastructure;
   providing the generated visual error signature for the detected error as input to a machine learning model;
   utilizing the machine learning model to classify the visual error signature for the detected error as belonging to at least a given one of a plurality of error classes, the machine learning model being trained using historical visual error signatures for a plurality of previously-detected errors;
   identifying at least one action taken to remediate one or more of the plurality of previously-detected errors of the given error class; and
   remediating the detected error utilizing the at least one identified action;
   wherein the method is performed by at least one processing device comprising a processor coupled to a memory.

2. The method of claim 1 wherein the one or more assets of the information technology infrastructure comprise at least one of physical and virtual computing resources in the information technology infrastructure.

3. The method of claim 2 wherein detecting the error comprises monitoring applications running on the physical and virtual computing resources.

4. The method of claim 1 wherein detecting the error comprises analyzing log messages collected from the one or more assets, the log messages being used to generate the graph-based visualization of the operation of the one or more assets of the information technology infrastructure.

5. The method of claim 1 wherein the portion of the graph-based visualization of operation of the one or more assets characterizes two or more sequences of operations of the one or more assets of the information technology infrastructure that diverge from a given operation, the two or more sequences comprising:
    at least a first sequence of operations to a first outcome comprising successful operation; and
    at least a second sequence of operations to a second outcome comprising the detected error.

6. The method of claim 1 wherein the graph-based visualization comprises a finite state machine comprising a plurality of nodes representing states of operation of the one or more assets of the information technology infrastructure and edges connecting the nodes representing transitions between the states of operation of the one or more assets of the information technology infrastructure.

7. The method of claim 6 wherein the generated visual error signature comprises a visualization of a given portion of the finite state machine, the given portion of the finite state machine comprising:
    a given one of the nodes corresponding to a state of operation of the one or more assets of the information technology infrastructure that is capable of transitioning along at least a first path to a success state and along at least a second path to a failure state;
    the first path to the success state; and
    the second path to the failure state.

8. The method of claim 1 wherein providing the generated visual error signature comprises:
    converting the portion of the graph-based visualization into an image of a pre-defined image size; and
    translating the image into a matrix representation for input to the machine learning model.

9. The method of claim 8 wherein the pre-defined image size comprises a pre-defined pixel size.

10. The method of claim 1 wherein the machine learning model comprises a multi-label classifier.

11. The method of claim 10 wherein the multi-label classifier comprises a K-nearest neighbor classifier.

12. The method of claim 10 wherein the multi-label classifier comprises a stochastic gradient descent classifier.

13. The method of claim 1 wherein the at least one identified action taken to remediate the one or more of the plurality of previously-detected errors of the given error class comprises applying one or more security hardening procedures to the one or more assets of the information technology infrastructure.

14. The method of claim 1 wherein the at least one identified action taken to remediate the one or more of the plurality of previously-detected errors of the given error class comprises modifying a configuration of the one or more assets of the information technology infrastructure.

15. A computer program product comprising a non-transitory processor-readable storage medium having stored therein program code of one or more software programs, wherein the program code when executed by at least one processing device causes the at least one processing device to perform steps of:
    detecting an error that has occurred in one or more assets of an information technology infrastructure;
    generating a visual error signature of the detected error, the visual error signature comprising at least a portion of a graph-based visualization of operation of the one or more assets of the information technology infrastructure;
    providing the generated visual error signature for the detected error as input to a machine learning model;
    utilizing the machine learning model to classify the visual error signature for the detected error as belonging to at least a given one of a plurality of error classes, the machine learning model being trained using historical visual error signatures for a plurality of previously-detected errors;
    identifying at least one action taken to remediate one or more of the plurality of previously-detected errors of the given error class; and
    remediating the detected error utilizing the at least one identified action.

16. The computer program product of claim 15 wherein the portion of the graph-based visualization of operation of the one or more assets characterizes two or more sequences of operations of the one or more assets of the information technology infrastructure that diverge from a given operation, the two or more sequences comprising:
    at least a first sequence of operations to a first outcome comprising successful operation; and
    at least a second sequence of operations to a second outcome comprising the detected error.

17. The computer program product of claim 15 wherein providing the generated visual error signature comprises:
    converting the portion of the graph-based visualization into an image of a pre-defined image size; and
    translating the image into a matrix representation for input to the machine learning model.

18. An apparatus comprising:
    at least one processing device comprising a processor coupled to a memory;
    the at least one processing device being configured to perform steps of:
        detecting an error that has occurred in one or more assets of an information technology infrastructure;
        generating a visual error signature of the detected error, the visual error signature comprising at least a portion of a graph-based visualization of operation of the one or more assets of the information technology infrastructure;
        providing the generated visual error signature for the detected error as input to a machine learning model;
        utilizing the machine learning model to classify the visual error signature for the detected error as belonging to at least a given one of a plurality of error classes, the machine learning model being trained using historical visual error signatures for a plurality of previously-detected errors;
        identifying at least one action taken to remediate one or more of the plurality of previously-detected errors of the given error class; and
        remediating the detected error utilizing the at least one identified action.

19. The apparatus of claim 18 wherein the portion of the graph-based visualization of operation of the one or more assets characterizes two or more sequences of operations of the one or more assets of the information technology infrastructure that diverge from a given operation, the two or more sequences comprising:
    at least a first sequence of operations to a first outcome comprising successful operation; and
    at least a second sequence of operations to a second outcome comprising the detected error.

20. The apparatus of claim 18 wherein providing the generated visual error signature comprises:
    converting the portion of the graph-based visualization into an image of a pre-defined image size; and translating the image into a matrix representation for input to the machine learning model.

\* \* \* \* \*